(12) United States Patent
Erickson et al.

(10) Patent No.: US 10,495,243 B2
(45) Date of Patent: *Dec. 3, 2019

(54) CLUTCHED JOINT FOR ARTICULATING FAUCET

(71) Applicant: Kohler Co., Kohler, WI (US)

(72) Inventors: Perry D. Erickson, Sheboygan, WI (US); Steven T. Radder, Kiel, WI (US); Christopher M. Shay, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 355 days.

This patent is subject to a terminal disclaimer.

(21) Appl. No.: 15/360,517

(22) Filed: Nov. 23, 2016

(65) Prior Publication Data
US 2017/0074441 A1 Mar. 16, 2017

Related U.S. Application Data

(63) Continuation of application No. 13/940,044, filed on Jul. 11, 2013, now Pat. No. 9,568,132.
(Continued)

(51) Int. Cl.
*F16L 27/08* (2006.01)
*E03C 1/04* (2006.01)

(52) U.S. Cl.
CPC .............. *F16L 27/08* (2013.01); *E03C 1/04* (2013.01); *E03C 1/0404* (2013.01);
(Continued)

(58) Field of Classification Search
CPC . F16L 27/0816; F16L 27/0828; F16L 27/087; F16L 27/093; F16L 27/0861; E03C 1/0404
(Continued)

(56) References Cited

U.S. PATENT DOCUMENTS

| 628,692 A | 7/1899 | Campbell |
| 814,448 A | 3/1906 | Hirth |

(Continued)

FOREIGN PATENT DOCUMENTS

| CH | 2969186 | 4/2005 |
| CN | 101688386 | 3/2010 |

(Continued)

OTHER PUBLICATIONS

Cucina Porto Pot Filler Faucets, www.plumbingsupply.com/potfillerfaucets.html, 1995-2008, 1 page.
(Continued)

*Primary Examiner* — David Bochna
(74) *Attorney, Agent, or Firm* — Foley & Lardner LLP

(57) ABSTRACT

A joint for an articulating faucet includes a first housing, a second housing, and a clutch assembly. The first housing defines a first inner cavity and the second housing defines a second inner cavity. The second housing is coupled to the first housing such that fluid may flow from the first inner cavity to the second inner cavity. The clutch assembly is coupled to at least one of the first housing and the second housing and is configured to apply a resistive torque that inhibits movement of the first and second housings relative to each other. The clutch assembly includes a clutch pin, an interface member, and an end cap. The end cap is coupled to a first end of the clutch pin and the interface member. Movement of the end cap varies the magnitude of the resistive torque applied by the clutch assembly.

18 Claims, 11 Drawing Sheets

Related U.S. Application Data

(60) Provisional application No. 61/671,422, filed on Jul. 13, 2012.

(52) U.S. Cl.
CPC ........ *F16L 27/0816* (2013.01); *F16L 27/0849* (2013.01); *E03C 2001/0414* (2013.01)

(58) Field of Classification Search
USPC .......................................................... 285/273
See application file for complete search history.

(56) References Cited

U.S. PATENT DOCUMENTS

| | | |
|---|---|---|
| 856,427 A | 6/1907 | Schulz |
| 1,003,033 A | 9/1911 | Cole |
| D56,935 S | 1/1921 | Mueller |
| 1,597,477 A | 8/1926 | Panhorst |
| D72,505 S | 4/1927 | Van Eweyk |
| 1,838,290 A | 12/1931 | Steckel |
| 2,083,970 A | 6/1937 | Walter |
| D117,697 S | 11/1939 | Mortimer |
| 2,220,216 A | 11/1940 | Cloutier |
| D141,718 S | 6/1945 | Blank |
| 2,417,494 A | 3/1947 | Hoof |
| 2,458,967 A | 1/1949 | Wiedenhoeft |
| 2,464,852 A | 3/1949 | De Lisa |
| 2,503,281 A | 4/1950 | Lynch et al. |
| 2,514,717 A | 7/1950 | Power |
| 3,064,998 A | 11/1962 | Syverson |
| 3,166,252 A | 1/1965 | O'Brien |
| 3,210,099 A | 10/1965 | Franck |
| 3,367,696 A | 2/1968 | Langley |
| 3,402,253 A | 9/1968 | McCracken |
| 3,726,318 A | 4/1973 | Hyde |
| 3,736,986 A | 6/1973 | Magdars |
| 3,967,838 A | 7/1976 | Legris |
| 4,437,690 A | 3/1984 | Drath |
| 4,592,388 A | 6/1986 | Wilcox |
| D313,836 S | 1/1991 | Knapp |
| D315,397 S | 3/1991 | Knapp |
| 5,014,749 A | 5/1991 | Humpert et al. |
| 5,040,729 A | 8/1991 | Carrozza |
| 5,050,246 A | 9/1991 | Huntoon |
| 5,056,562 A | 10/1991 | Pawelzik et al. |
| D326,505 S | 5/1992 | Kohler et al. |
| D344,127 S | 2/1994 | Carr et al. |
| 5,290,074 A | 3/1994 | Chapman |
| D347,262 S | 5/1994 | Black et al. |
| D348,925 S | 7/1994 | Miller |
| D351,529 S | 10/1994 | Scott, Jr. |
| 5,372,389 A | 12/1994 | Tam |
| 5,405,173 A | 4/1995 | Goughneour |
| D363,763 S | 10/1995 | Starck |
| D376,413 S | 12/1996 | Kergoet |
| D378,491 S | 3/1997 | Chretien |
| D440,637 S | 4/2001 | Lefroy-Brooks |
| 6,336,764 B1 | 1/2002 | Liu |
| D457,938 S | 5/2002 | Lobermeier |
| D458,988 S | 6/2002 | Schroder |
| 6,425,149 B1 | 7/2002 | Wang |
| D461,529 S | 8/2002 | Gottwald |
| D464,711 S | 10/2002 | Warshawsky |
| D469,157 S | 1/2003 | Lobermeier |
| 6,511,001 B1 | 1/2003 | Huang |
| D470,577 S | 2/2003 | Knight et al. |
| D472,308 S | 3/2003 | Hundley |
| D475,437 S | 6/2003 | Dimitriadis et al. |
| D478,370 S | 8/2003 | Ouyoung |
| D481,445 S | 10/2003 | Haug et al. |
| D483,097 S | 12/2003 | Napoli |
| D491,253 S | 6/2004 | Hansle |
| D492,393 S | 6/2004 | Herring et al. |
| D496,714 S | 9/2004 | Warshawsky |
| D496,715 S | 9/2004 | Warshawsky |
| D497,197 S | 10/2004 | Warshawsky |
| D497,410 S | 10/2004 | Warshawsky |
| D497,411 S | 10/2004 | Warshawsky |
| 6,813,787 B2 | 11/2004 | Rosenberg |
| D508,551 S | 8/2005 | Warshawsky |
| D508,552 S | 8/2005 | Warshawsky |
| D514,198 S | 1/2006 | Starck |
| D514,664 S | 2/2006 | Starck |
| D516,171 S | 2/2006 | Meylan |
| D525,342 S | 7/2006 | Starck |
| D527,076 S | 8/2006 | Kolin et al. |
| 7,097,122 B1 | 8/2006 | Farley |
| D527,796 S | 9/2006 | Lammel |
| D528,188 S | 9/2006 | Lammel et al. |
| D529,580 S | 10/2006 | Shieh |
| D530,787 S | 10/2006 | Yoshioka et al. |
| D531,698 S | 11/2006 | Wood et al. |
| D534,992 S | 1/2007 | Lobermeier et al. |
| D535,356 S | 1/2007 | Kuran et al. |
| D540,435 S | 4/2007 | Wilcox et al. |
| D545,406 S | 6/2007 | Surinak |
| D548,308 S | 8/2007 | Hoernig |
| D551,324 S | 9/2007 | Wilcox et al. |
| D560,762 S | 1/2008 | Eckhaus |
| D562,947 S | 2/2008 | Zhang |
| D565,705 S | 4/2008 | Kuran et al. |
| D571,437 S | 6/2008 | Kristensen et al. |
| D576,705 S | 9/2008 | McKeone |
| 7,419,127 B2 | 9/2008 | Buehler |
| D579,080 S | 10/2008 | Zhang |
| D584,383 S | 1/2009 | Eilmus |
| D585,111 S | 1/2009 | Eilmus |
| D589,121 S | 3/2009 | McKeone |
| D591,398 S | 4/2009 | Lammel et al. |
| D591,407 S | 4/2009 | Youssef et al. |
| D599,893 S | 9/2009 | Sieger |
| D601,230 S | 9/2009 | Misir |
| D606,173 S | 12/2009 | Sieger |
| D612,015 S | 3/2010 | Lammel et al. |
| D615,166 S | 5/2010 | Patti |
| D619,220 S | 7/2010 | Semchuck et al. |
| D620,557 S | 7/2010 | Eilmus |
| D627,857 S | 11/2010 | Eilmus |
| D630,711 S | 1/2011 | Eilmus |
| D632,363 S | 2/2011 | McKeone |
| D641,454 S | 7/2011 | McKeone |
| D643,911 S | 8/2011 | Erickson et al. |
| 8,024,822 B2 | 9/2011 | Macan et al. |
| D646,359 S | 10/2011 | Sieger |
| 8,061,386 B2 | 11/2011 | Mueller et al. |
| 8,070,076 B2 | 12/2011 | Erickson et al. |
| 8,082,610 B2 | 12/2011 | Henry et al. |
| 8,292,332 B2 | 10/2012 | Mitchell |
| 8,596,686 B1 * | 12/2013 | Desai .................. F16L 27/0845 239/587.6 |
| 8,919,672 B2 | 12/2014 | Chen |
| 9,568,132 B2 * | 2/2017 | Erickson |
| 2005/0283904 A1 | 12/2005 | Macan |
| 2006/0180222 A1 | 8/2006 | Kang |
| 2007/0251590 A1 | 11/2007 | Weinstein |
| 2008/0083844 A1 | 4/2008 | Leber |
| 2009/0242671 A1 | 10/2009 | Erickson |
| 2014/0015246 A1 | 1/2014 | Erickson |

FOREIGN PATENT DOCUMENTS

| | | |
|---|---|---|
| CN | 102016190 | 4/2011 |
| WO | WO-88/09896 | 12/1988 |
| WO | WO-2004/106651 | 12/2004 |

OTHER PUBLICATIONS

U.S. Appl. No. 21/441,678, filed Jan. 8, 2013, Eilmus, Niels J.
Danze Deck Mount Pot Filler, Parma Collection, www.plumbingsupply.com/potfillerfaucets.html, 1995-2008, 1 page.
Danze Opulence Pot Filler Kitchen Faucet, http:www.faucet.com/decor/product.pl?mid+66199&fh+Chrome&N=222+3000606+222+103+219+55+3000368&Ne+5&CID+GOA, 1994-2007, 1 page.

(56) References Cited

OTHER PUBLICATIONS

Danze Quality Wall Mount Pot Filler Faucet, Melrose Collection, www.plumbingsupply.com/potfillerfaucets.html, 1995-2008, 1 page.
Elements of Design, NuVo Pot Filler Faucets, www.plumbingsupply.com/potfillerfaucets.html, 1995-2008, 1 page.
Kohler Co., Fountainhead Integral Laminar Faucet, www.us.kohler.com/onlinecatalog/detail.jsp?from=thumb&frm=null&module=Lav, Dec. 31, 2007, 1 page.
Kohler Co., Margaux Single-Control Lavatory Faucet, Model K-16230-4, www.us.kohler.com/onlinecatalog/detail.jsp?from=thumb&frm=&module=Lavator, Dec. 31, 2007, 1 page.
PCT Search Report in PCT/US2009/001840 dated Jul. 14, 2009, 9 pages.

* cited by examiner

CLUTCHED JOINT FOR ARTICULATING FAUCET

CROSS-REFERENCE TO RELATED APPLICATION

This application is a continuation of U.S. patent application Ser. No. 13/940,044, which was filed on Jul. 11, 2013 (now U.S. Pat. No. 9,568,132) and claims the benefit of and priority to U.S. Provisional Patent Application No. 61/671,422, which was filed on Jul. 13, 2012, the complete disclosures of which are incorporated by reference herein.

BACKGROUND

The present application relates to a water faucet system. Particularly, the present application relates to a joint for an articulating faucet and methods for installing and adjusting the resistive force within the joint. The present application further relates to resistive systems and methods for inhibiting relative movement between arms of an articulated faucet. Faucet systems transport water from a water source to a location that is preferred by a user. The user may prefer a particular location for the water in order to carry out a task, such as cleaning or spraying.

These tasks typically require great mobility of the water faucet system in order to effectively spray the water at desired angles to various locations that are preferred by the user. Traditional methods for transporting water to a preferred location include a fixed faucet and a spray hose assembly. These spray hose assemblies include a spray hose, a spray head, and a trigger. Other traditional systems have a fixed faucet that includes a spray head. Thus, traditional faucet systems require both a spray hose assembly and a fixed faucet in order to transport water at desired angles to various locations that are preferred by the user. Despite this duplication, a fixed faucet and a separate spray hose assembly remain the primary methods used for transporting water to a location that is preferred by the user.

SUMMARY

One exemplary embodiment of the present disclosure relates to a joint for an articulating faucet. The joint includes a first housing, a second housing, and a clutch assembly. The first housing defines a first inner cavity and the second housing defines a second inner cavity. The second housing is coupled to the first housing such that fluid may flow from the first inner cavity to the second inner cavity. The clutch assembly is coupled to at least one of the first housing and the second housing and is configured to apply a resistive torque that inhibits movement of the first and second housings relative to each other. The clutch assembly includes a clutch pin, an interface member, and an end cap. The end cap is coupled to a first end of the clutch pin and the interface member. Movement of the end cap varies the magnitude of the resistive torque applied by the clutch assembly.

Another exemplary embodiment of the present disclosure relates to a joint for an articulating faucet. The joint includes a first housing rotatably coupled to a second housing, a clutch pin, an annular clutch disc, a first friction element, a second friction element, and an interface member. The clutch pin includes a movable end cap. The annular clutch disc defines an aperture that receives the clutch pin. The first friction element is coupled to the annular clutch disc, and the second friction element is in contact with the first friction element. Relative movement between the first friction element and the second friction element provides a resistive torque that inhibits relative motion between the first housing and the second housing. The interface member is coupled to the annular clutch disc and configured to apply a force to at least one of the first friction element and the second friction element that varies based on the position of the movable end cap.

Still another exemplary embodiment of the present disclosure relates to an articulating faucet. The articulating faucet includes a vertical support, a first arm, a second arm, and a spray head. The vertical support includes an upper portion and a lower portion. The first arm is coupled to the upper portion of the vertical support at a first joint, the second arm is coupled to the first arm at a second joint, and the spray head is coupled to the second arm at a third joint. At least one of the first joint, the second joint, and the third joint include a first housing, a second housing, and a clutch assembly. The clutch assembly includes a clutch pin, an interface member, and an end cap. The end cap is coupled to a first end of the clutch pin and the interface member. Movement of the end cap varies the magnitude of a resistive torque applied by the clutch assembly.

BRIEF DESCRIPTION OF THE DRAWINGS

The disclosure will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the application may be not limited to the details or methodology set forth in the description or illustrated in the figures. It should also be understood that the terminology may be for the purpose of description only, and should not be regarded as limiting.

Figure 1:
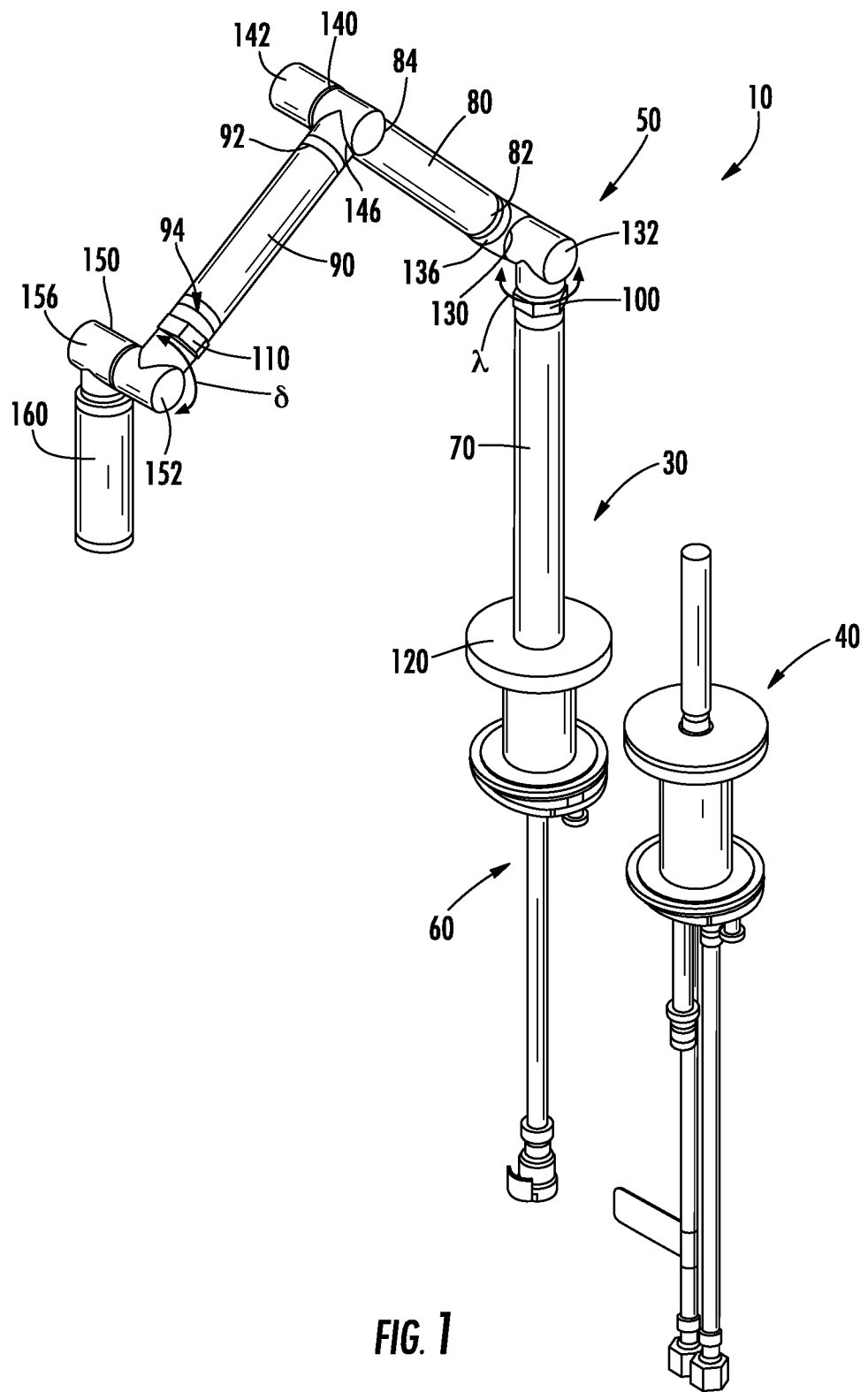
FIG. 1 is a perspective view of a water delivery system, according to an exemplary embodiment.

Referring to the exemplary embodiment shown in FIG. 1, a water faucet system includes a flow device 10. As shown in FIG. 1, flow device 10 includes a spigot, shown as faucet assembly 30. Flow device 10 further includes a valve system, shown as handle assembly 40. According to an exemplary embodiment, faucet assembly 30 includes a spout assembly, shown as articulating faucet 50, and a connection assembly, shown as water hook-up 60. According to an exemplary embodiment, water hook-up 60 is coupled to handle assembly 40 such that water flows from handle assembly 40 and into water hook-up 60. Water hook-up 60 may be coupled with articulating faucet 50 such that water flows from water hook-up 60 and into articulating faucet 50 for direction to a location that is preferred by the user.

According to an alternative embodiment, water hook-up 60 is integrated within articulating faucet 50. The combination of water hook-up 60 and articulating faucet 50 may be coupled to handle assembly 40 such that water flows from handle assembly 40 and through articulating faucet 50. Such a configuration removes components from faucet assembly 30 and simplifies the design of flow device 10.

Referring again to the exemplary embodiment shown in FIG. 1, articulating faucet 50 includes a vertical flow tube, shown as vertical support 70. Vertical support 70 may be a structural member configured to support the weight of certain components of articulating faucet 50. As shown in FIG. 1, vertical support 70 is a cylindrical tube (e.g., a thin-wall tube, pipe, cylinder, conduit, etc.). Vertical support 70 includes an inner chamber configured to receive water flow from water hook-up 60 and direct it to other portions of articulating faucet 50. According to an alternative embodiment, vertical support 70 further includes an inner tube configured to receive water flow from water hook-up 60. This inner tube may be configured to transport water to other portions of articulating faucet 50 and direct water flow to a location that is preferred by a user.

Referring still to the exemplary embodiment shown in FIG. 1, articulating faucet 50 further includes water flow members, shown as first arm 80 and second arm 90. First arm 80 and second arm 90 have an internal passage to receive water flow from vertical support 70 and further direct it to a location that is preferred by the user. As shown in FIG. 1, first arm 80 includes a first end 82 and a second end 84. The first end 82 of first arm 80 may be coupled to vertical support 70. Second arm 90 includes a first end 92 and a second end 94. The first end 92 of second arm 90 may be coupled to the second end 84 of first arm 80. Such coupling provides a movable joint between the arms and allows water to flow from vertical support 70 through first arm 80 and into second arm 90.

According to the exemplary embodiment shown in FIG. 1, first arm 80 and second arm 90 are tubular structures (e.g., a thin-walled tube, pipe, cylinder, conduit, etc.). Such tubular structures include an inner cavity. First arm 80 and second arm 90 may include an inner tube within the cavity configured to transport water flow through first arm 80 and second arm 90. According to an alternative embodiment, first arm 80 and second arm 90 transport water within the cavity of first arm 80 and second arm 90 without additional internal structures.

According to the exemplary embodiment shown in FIG. 1, articulating faucet 50 further includes an atomizer, shown as spray head 160. Other water delivery devices or heads may be substituted for spray head 160, according to an alternative embodiment. Spray head 160 may be coupled to second end 94 of second arm 90. Spray head 160 further directs water flow in one or more desired patterns to a location that is preferred by the user. In some embodiments, spray head 160 varies a delivery characteristic of the water flow. Such delivery characteristics may include pressure, velocity, temperature, or other characteristics. According to an exemplary embodiment, spray head 160 includes one or more spray nozzles. Such spray nozzles may be configured to facilitate a spray operation desired by the user. By way of example, the user may desire a spray operation in order to facilitate a cleaning or washing operation. As shown in FIG. 1, spray head 160 is generally cylindrical. According to various alternative embodiments, spray head 160 may be cone-shaped, trapezoid-shaped, or otherwise shaped to facilitate a spray operation.

Referring again to the exemplary embodiment shown in FIG. 1, articulating faucet 50 further includes unions, shown as first joint 130, second joint 140, and third joint 150. As shown in FIG. 1, first joint 130, second joint 140, and third joint 150 couple the various components of articulating faucet 50 together. According to an exemplary embodiment, first joint 130 couples vertical support 70 to first arm 80, second joint 140 couples first arm 80 to second arm 90, and third joint 150 couples second arm 90 to spray head 160. First joint 130, second joint 140, and third joint 150 facilitate relative movement between the various components of articulating faucet 50. By way of example, first joint 130 facilitates planar movement of first arm 80 relative to vertical support 70. The planar movement allowed by first joint 130, second joint 140, and third joint 150 facilitate the delivery of water flow to a location that is preferred by a user.

According to the exemplary embodiment shown in FIG. 1, first joint 130, second joint 140, and third joint 150 each include two portions. As shown FIG. 1, first joint 130 includes a first housing 132 and a second housing 136. First housing 132 may be coupled with an upper portion of vertical support 70, and second housing 136 may be coupled to first arm 80. A first housing 142 of second joint 140 may be coupled with first arm 80, and a second housing 146 of second joint 140 may be coupled with second arm 90. A first housing 152 of third joint 150 may be coupled with second arm 90, and a second housing 156 of third joint 150 may be coupled with spray head 160. In order to facilitate movement of articulating faucet 50, the two portions of first joint 130, second joint 140, and third joint 150 are moveable relative to one another. According to an exemplary embodiment, the two portions of first joint 130, second joint 140, and third joint 150 remain stationary until moved with a force applied by a user.

Referring again to the exemplary embodiment shown in FIG. 1, articulating faucet 50 further includes couplers, shown as first swivel nut 100 and second swivel nut 110. According to an alternative embodiment, articulating faucet 50 includes only first swivel nut 100. As shown in FIG. 1, first swivel nut 100 is coupled to both an upper portion of vertical support 70 and first housing 132 of first joint 130. Second swivel nut 110 is coupled to both second arm 90 and first housing 152 of third joint 150. First swivel nut 100 and second swivel nut 110 allow for rotational movement of the various components of articulating faucet 50. As shown in FIG. 1, coupling first swivel nut 100 with vertical support 70 allows for rotational movement of first arm 80 and second arm 90 about a central axis of vertical support 70. Such rotational movement occurs through an angle $\lambda$ measured with respect to an initial starting position of first arm 80 or second arm 90. According to an exemplary embodiment, first arm 80 and second arm 90 rotate freely about the central axis of vertical support 70 such that angle $\lambda$ ranges between 0° and 360°. As shown in FIG. 1, second swivel nut 110 allows for rotational movement of third joint 150 and spray head 160 about a central axis of second arm 90. Such rotational movement occurs through an angle $\delta$ measured with respect to an initial starting position of third joint 150 and spray head 160. According to an exemplary embodiment, third joint 150 and spray head 160 rotate freely about the central axis of second arm 90 such that angle δ ranges between 0° and 360°.

Referring again to the exemplary embodiment shown in FIG. 1, faucet assembly 30 further includes a cover, shown as base plate 120. As shown in FIG. 1, base plate 120 is disc-shaped. Base plate 120 may be a solid disc or may include an internal cavity formed within base plate 120. Base plate 120 may be manufactured according to various known methods (e.g., machined from a billet, cast, stamped, etc.). Base plate 120 covers the lower portion of faucet assembly 30. Such covering may serve the aesthetic purpose of hiding at least a portion of water hook-up 60 from view. According to an alternative embodiment, base plate 120 is a structural member configured to support at least a portion of articulating faucet 50. As shown in FIG. 1, base plate 120 is aligned coaxially with vertical support 70 and includes an aperture configured to receive a bottom portion of vertical support 70.

The various components of articulating faucet 50 may be manufactured using any suitable material. According to an exemplary embodiment, the components of articulating faucet 50 are manufactured from a metal (e.g., brass, stainless steel, etc.) and formed using various known methods (e.g., forging, machining, gravity casting, investment casting, etc.). By way of example, first housings 132, 142, and 152 may be forged from brass and finish machined, whereas second housings 136, 146, and 156 may be cast from brass and finish machined. According to an alternative embodiment, at least one component of articulating faucet 50 is manufactured by casting a base material and surrounding (e.g., plating) the base material with a decorative finish. Such decorative finishes may include various metals (e.g., nickel, copper, chromium, etc.), various non-metals (e.g., rubber, plastic, etc.), or an applied pattern.

Figure 2:
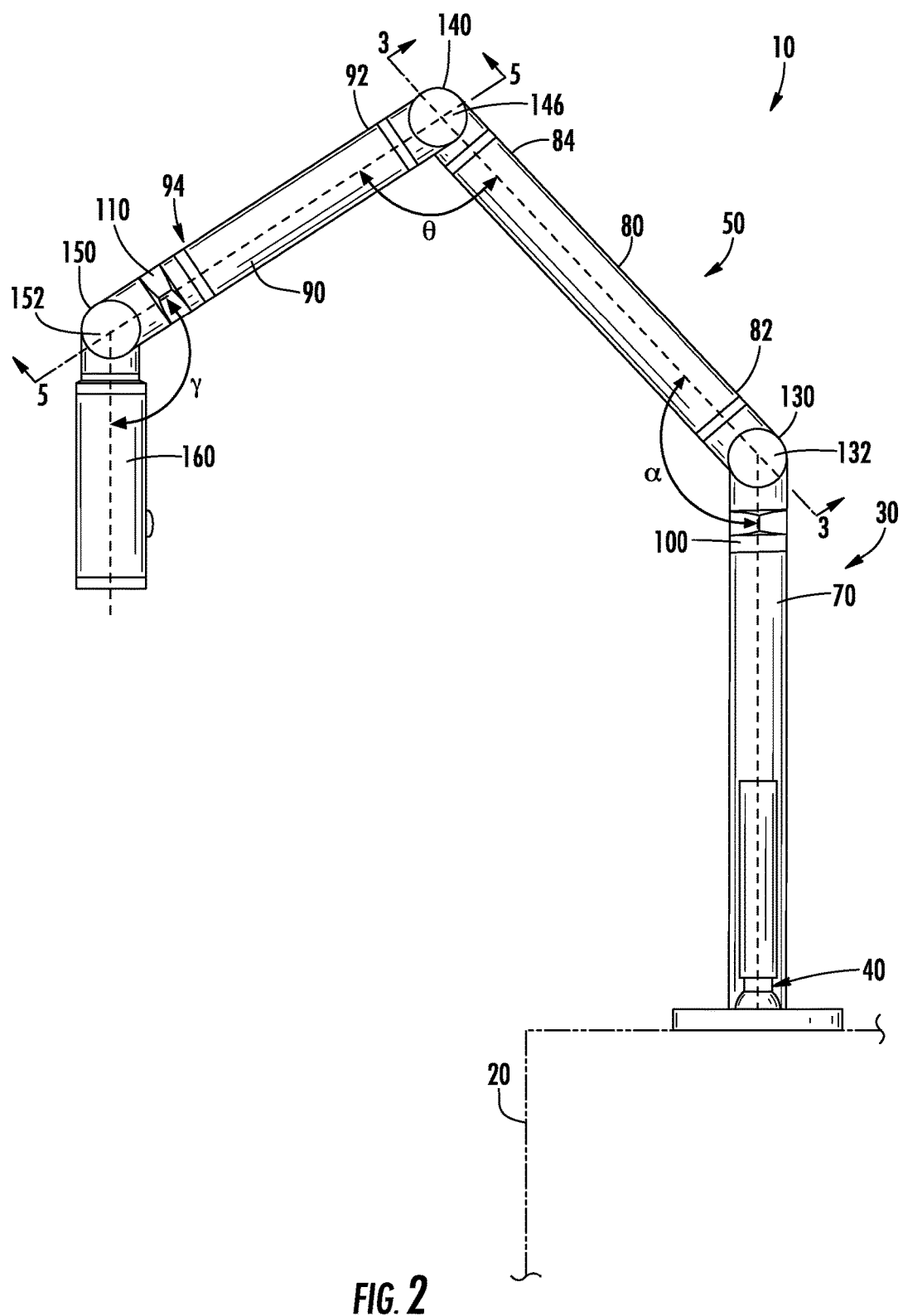
FIG. 2 is a side plan view of a spigot delivery system, according to an exemplary embodiment.

Referring next to FIG. 2, flow device 10 is shown, according to an exemplary embodiment. As discussed above, flow device 10 is shown to include faucet assembly 30 and handle assembly 40. Faucet assembly 30 also includes water hook-up 60 (not shown) and articulating faucet 50. According to the exemplary embodiment shown in FIG. 2, flow device 10 is coupled to a mounting surface, shown as basin 20, that is configured to structurally support flow device 10. According to an exemplary embodiment, basin 20 is a countertop surface. According to an alternative embodiment, basin 20 is a surface coupled to or integrally formed with a sink. Basin 20 may be solid and include a void configured to receive flow device 10. According to an alternative embodiment, basin 20 includes a plate structure having an aperture therein that is configured to receive flow device 10.

Referring again to FIG. 2, articulating faucet 50 includes vertical support 70, first arm 80, and second arm 90. Vertical support 70 may be coupled to first arm 80 by first joint 130, first arm 80 may be coupled to second arm 90 by second joint 140, and second arm 90 may be coupled to spray head 160 by third joint 150. As discussed above, first swivel nut 100 and second swivel nut 110 allow for rotational movement around the center axes of vertical support 70 and second arm 90, respectively. As shown in FIG. 2, first arm 80 rotates relative to vertical support 70 about first joint 130. The angle of rotation of first arm 80 relative to vertical support 70 may be measured between the centerline of first arm 80 and the centerline of vertical support 70. Such angle of rotation is shown in FIG. 2 as angle α. The rotation of first arm 80 about first joint 130 may be limited only by interference between the components of articulating faucet 50. By way of example, second joint 140 may interfere with vertical support 70. According to an exemplary embodiment, angle α ranges between approximately 10° and 350°.

Referring still to FIG. 2, second arm 90 rotates relative to first arm 80 about second joint 140. As shown in FIG. 2, the angle between second arm 90 and first arm 80 may be measured between the centerlines of second arm 90 and first arm 80 and defined as angle θ. The rotation of second arm 90 with respect to first arm 80 may be limited only by interference between the components of articulating faucet 50. By way of example, third joint 150 may interfere with first arm 80. According to an exemplary embodiment, angle θ ranges between approximately 10° and 350°. According to an alternative embodiment, spray head 160 may be rotated approximately 90° about the centerline of second arm 90. Such rotation of spray head 160 allows second arm 90 to rotate freely about second joint 140 such that angle θ ranges between approximately 0° and 360°.

Referring still to FIG. 2, spray head 160 rotates relative to second arm 90 about third joint 150. As shown in FIG. 2, the angle between spray head 160 and second arm 90 may be measured between the center line of spray head 160 and the center line of second arm 90 and defined as angle γ. According to an exemplary embodiment, spray head 160 may rotate freely around third joint 150 such that angle γ ranges between approximately 0° to 360°. According to an alternative embodiment, angle γ ranges between approximately 20° and 345°.

The relative rotations of first arm 80 with respect to vertical support 70, second arm 90 with respect to first arm 80, and spray head 160 with respect to second arm 90 allow for controlled delivery of water flow. As discussed above, first swivel nut 100 and second swivel nut 110 further facilitate the controlled delivery of water flow. According to an exemplary embodiment, first joint 130, second joint 140, third joint 150, first swivel nut 100, and second swivel nut 110 allow for directed water flow to a location that is preferred by a user. Such a preferred location may be within or outside basin 20.

Figure 3:
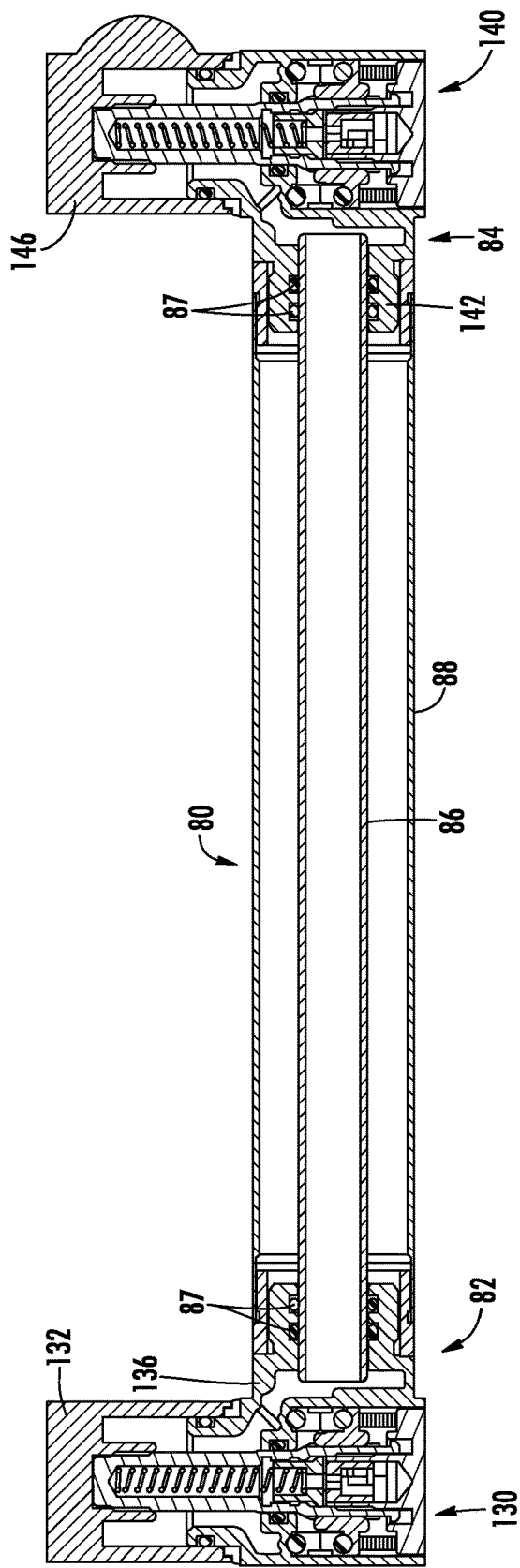
FIG. 3 is a sectional view of an articulating arm and joint assembly, according to an exemplary embodiment.

Referring next to FIG. 3, a sectional view of first arm 80 is shown, according to an exemplary embodiment. As shown in FIG. 3, first arm 80 includes an inner tube 86 and an outer tube 88. As shown in FIG. 3, inner tube 86 is located within outer tube 88. Inner tube 86 may be coaxial with outer tube 88. According to the exemplary embodiment shown in FIG. 3, water flows from first joint 130 and through inner tube 86 and second joint 140. As shown in FIG. 3, inner tube 86 includes a first end coupled to second housing 136 of first joint 130 and a second end coupled to first housing 142 of second joint 140. Second housing 136 of first joint 130 includes an aperture configured to receive inner tube 86. According to an exemplary embodiment, inner tube 86 is coupled to second housing 136 in a manner that prevents water flow from leaking between second housing 136 and inner tube 86. Such leaking may be prevented with a sealing member, shown as O-ring 87. As shown in FIG. 3, outer tube 88 may be coupled to second housing 136 of first joint 130 and first housing 142 of second joint 140.

Figure 4:
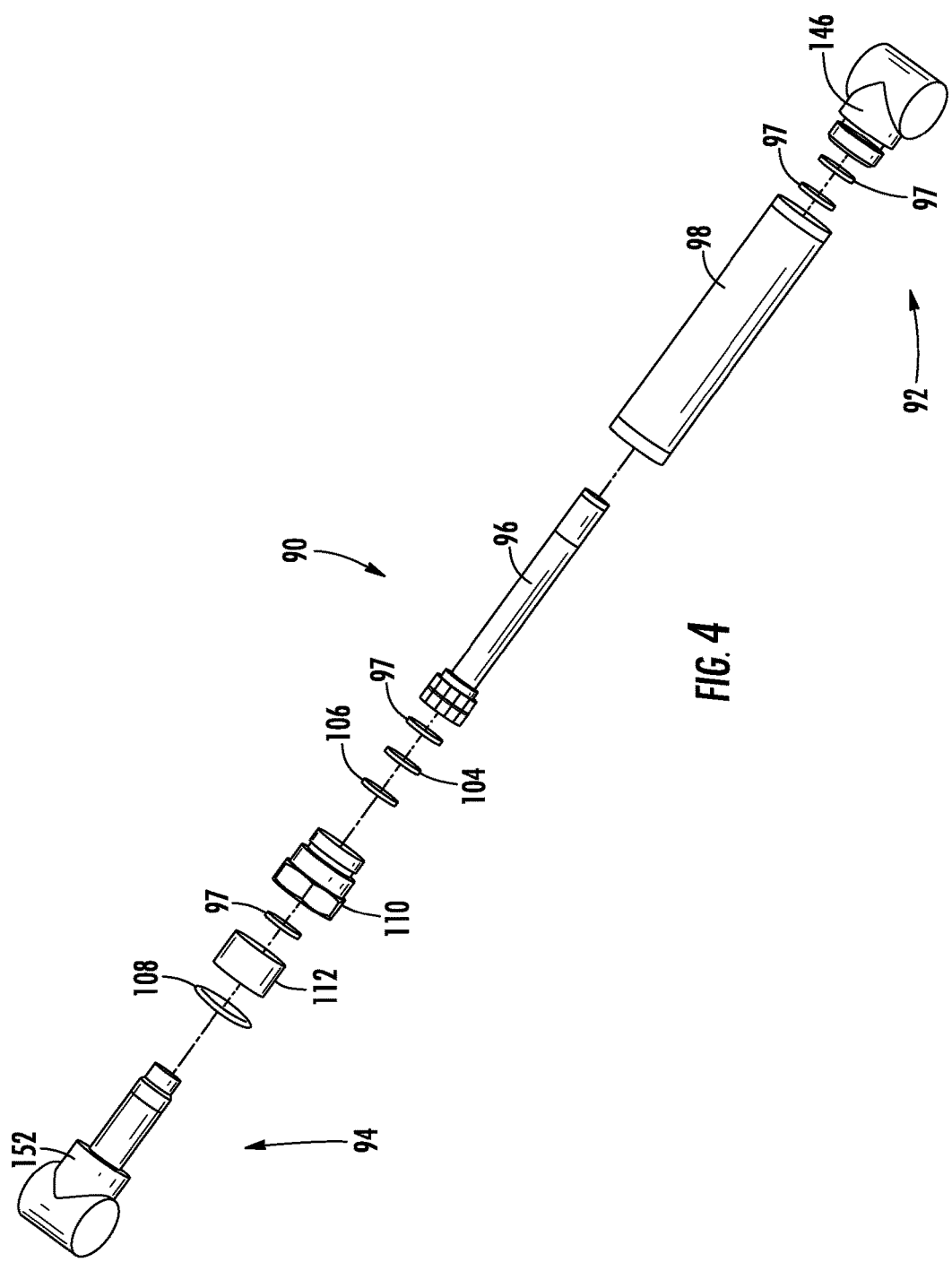
FIG. 4 is an exploded view of an articulating arm and joint assembly, according to an exemplary embodiment.

Referring next to FIG. 4, second arm 90 is shown, according to an exemplary embodiment. As shown in FIG. 4, second arm 90 includes a first end 92 and a second end 94. According to an exemplary embodiment shown in FIG. 4, second arm 90 further includes an inner tube 96 and an outer tube 98. Inner tube 96 may be configured to receive water flow from second housing 146 of second joint 140 and deliver the water flow to first housing 152 of third joint 150. As shown in FIG. 4, second arm 90 further includes sealing members, shown as O-rings 87, and wear members, shown as first interface 104, second interface 106, and third interface 108 (e.g., washer, bushing, base, etc.). According to an exemplary embodiment, second arm 90 further includes second swivel nut 110. Second swivel nut 110 allows for rotation about a central axis of second arm 90, as discussed above. As shown in FIG. 4, second swivel nut 110 includes an inner support 112.

Figure 5:
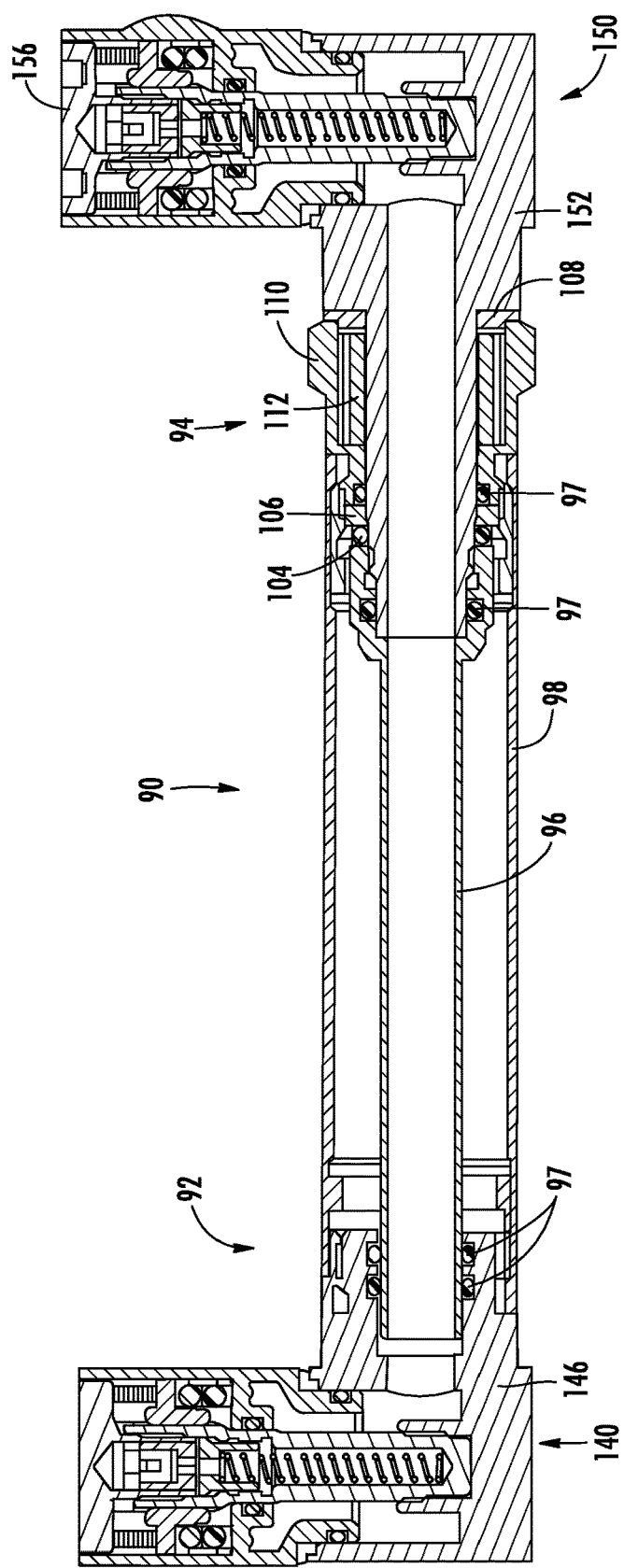
FIG. 5 is a sectional view of an articulating arm and joint assembly, according to an exemplary embodiment.

Referring next to FIG. 5, a sectional view of second arm 90 is shown, according to an exemplary embodiment. As shown in FIG. 5, second arm 90 includes inner tube 96 and outer tube 98. Inner tube 96 may be located coaxially with outer tube 98. Inner tube 96 includes a first end and a second end. As shown in FIG. 5, the first end of inner tube 96 is received into second housing 146 of second joint 140. As discussed above, inner tube 96 may be configured to receive water flow from second housing 146 of second joint 140 and deliver the water flow to first housing 152 of third joint 150. In order to prevent water from leaking out of second housing 146, inner tube 96 may be sealably coupled to second housing 146 of second joint 140. As shown in FIG. 5, such coupling includes seals, shown as O-rings 97.

Referring still to the exemplary embodiment shown in FIG. 5, the second end of inner tube 96 is coupled to first interface 104, second interface 106, and first housing 152 of third joint 150. As shown in FIG. 5, inner tube 96 receives a portion of first housing 152 and includes two O-rings 97. According to an exemplary embodiment, outer tube 98 includes a first end coupled to second housing 146 of second joint 140 and a second end coupled to second swivel nut 110. As shown in FIG. 5, second swivel nut 110 includes inner support 112 and is coupled to outer tube 98 and third interface 108. Third interface 108 may be further coupled with first housing 152 of third joint 150 such that third interface 108 is sandwiched between second swivel nut 110 and first housing 152 of third joint 150.

Figure 6:
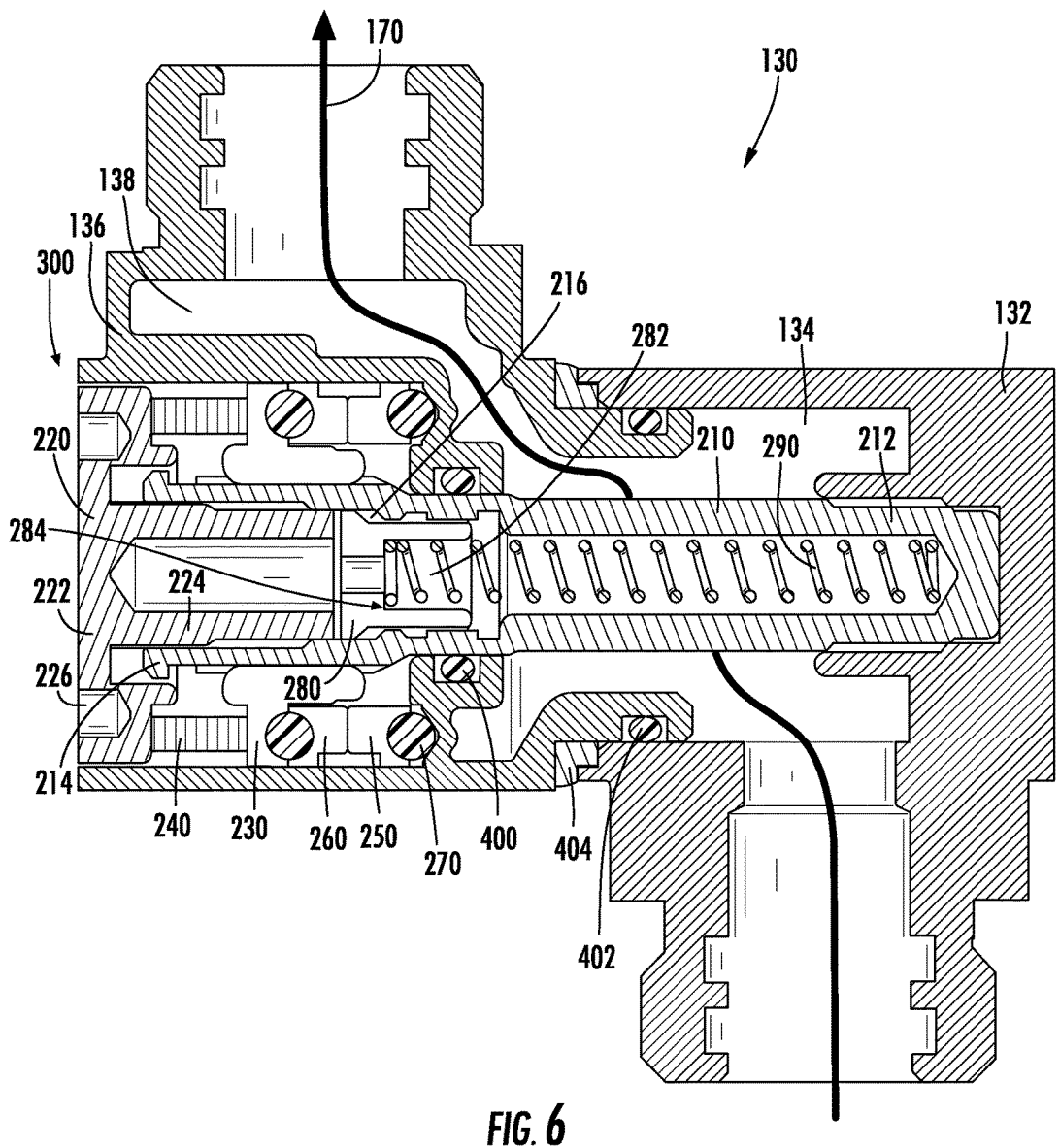
FIG. 6 is a sectional view of an articulating joint assembly, according to an exemplary embodiment.

Referring next to FIG. 6, a sectional view of first joint 130 is shown, according to an exemplary embodiment. While first joint 130 is discussed, it should be understood that first joint 130, second joint 140, and third joint 150 may include similar or identical components and function comparably. First joint 130 includes first housing 132 and second housing 136. First housing 132 includes a cavity, shown as void 134, and second housing 136 includes a cavity, shown as void 138. As shown in FIG. 6, first housing 132 is coupled to second housing 136 such that void 134 is in fluid communication with void 138. This fluid communication between void 134 and void 138 forms a fluid passageway, shown as flow path 170, between first housing 132 and second housing 136.

As shown in FIG. 6, first joint 130 further includes a stabilizing system, shown as clutch assembly 300. According to an exemplary embodiment, clutch assembly 300 inhibits movement of the components of articulating faucet 50. By way of example, clutch assembly 300 may inhibit the movement of first arm 80 with respect to vertical support 70, second arm 90 with respect to first arm 80 or spray head 160 with respect to second arm 90 by inhibiting movement of at least one of first joint 130, second joint 140, and third joint 150, respectively. The weight of spray head 160, second arm 90, first arm 80, first joint 130, second joint 140, and third joint 150 impart a turning torque on first joint 130, second joint 140, and third joint 150. Clutch assembly 300 may be configured to oppose the turning torque caused by the weight of the various components of articulating faucet 50 in order to prevent articulating faucet 50 from moving absent a force applied by a user.

According to an exemplary embodiment, clutch assembly 300 includes an axle, shown as clutch pin 210. Clutch pin 210 includes a first end 212 and a second end 214. As shown in FIG. 6, clutch pin 210 further includes a void, shown as cavity 216. The first end 212 of clutch pin 210 may be coupled to first housing 132 such that clutch pin 210 serves as the axis of rotation of first joint 130. As shown in FIG. 6, first end 212 of clutch pin 210 includes exterior threads configured to be received by interior threads within first housing 132. Clutch pin 210 may include an internal, hexagon-shaped void at second end 214 that is configured to receive a tool therein. Such a tool may be used to torque clutch pin 210 to a specified value. While a threaded connection is disclosed, first end 212 of clutch pin 210 may be coupled to first housing 132 according to various known techniques (e.g., snap ring, press fit connection, a snap connection, etc.).

Referring again to FIG. 6, clutch assembly 300 includes an adjuster, shown as end cap 220. According to an exemplary embodiment, end cap 220 includes a body portion, shown as base 222, and an extended portion, shown as protrusion 224. According to exemplary embodiment shown in FIG. 6, base 222 is a circular disc having a diameter larger than the diameter of protrusion 224. End cap 220 may be coupled to clutch pin 210 and facilitate the adjustment of clutch assembly 300. According to the exemplary embodiment shown in FIG. 6, protrusion 224 is coupled to second end 214 of clutch pin 210 with a threaded connection. According to various alternative embodiments, protrusion 224 of end cap 220 may be coupled to second end 214 of clutch pin 210 according to alternative means (e.g., snap ring, press fit, a snap connection, etc.). As shown in FIG. 6, end cap 220 further includes torque application points, shown as blind holes 226. Blind holes 226 may allow a manufacturer or user to adjust the rotational resistive torque applied by clutch assembly 300.

According to the exemplary embodiment shown in FIG. 6, clutch assembly 300 further includes a contact element, shown as interface member 240 (e.g., washer, bushing, base, spring, etc.). Interface member 240 may be slidably coupled with end cap 220. According to an exemplary embodiment, interface member 240 is a wave spring. Interface member 240 may be a traditional wave spring, having a specified spring force. According to an exemplary embodiment, interface member 240 has a spring rate of approximately 4,375 pounds per inch, or 4.375 pounds for 0.001 inches of displacement. When compressed, interface member 240 is configured to apply a compression force to end cap 220. According to the exemplary embodiment shown in FIG. 6, the threaded connection between end cap 220 and clutch pin 210 allows for adjustment of the preload displacement of interface member 240. Such adjustment allows clutch assembly 300 to overcome the manufacturing variability of the numerous components of clutch assembly 300 and promotes positive engagement between the various components of articulating faucet 50.

According to the exemplary embodiment shown in FIG. 6, clutch assembly 300 further includes a driven element, shown as clutch disc 230. Clutch disc 230 may be slidably coupled to clutch pin 210. According to the exemplary embodiment shown in FIG. 6, clutch pin 210 includes an outer splined portion, and clutch disc 230 includes an inner splined portion. This splined connection between clutch disc 230 and clutch pin 210 allows for clutch disc 230 to slide along the length of clutch pin 210 while forcing clutch disc 230 to rotate with clutch pin 210. Such a splined connection allows for the transfer of torque between clutch pin 210 and clutch disc 230. According to various alternative embodiments, clutch disc 230 may be coupled with clutch pin 210 using another known technique (e.g., snap rings, press fit, a snap connection, etc.). According to the exemplary embodiment shown in FIG. 6, clutch disc 230 is coupled with interface member 240 such that interface member 240 applies a force to clutch disc 230. In some embodiments, the force applied by interface member 240 is configured to load clutch disc 230.

Referring again to FIG. 6, clutch assembly 300 further includes limiting elements. According to an exemplary embodiment, such limiting elements include a first resistive member, shown as first friction element 250, and a second resistive member, shown as second friction element 260. According to an exemplary embodiment, first friction element 250 is slidably coupled with second friction element 260. Such coupling is intended to facilitate a desired tactile sense (e.g., "feel," etc.) during movement of the first joint 130. The movement between first friction element 250 and second friction element 260 may be facilitated by a lubricating substance. First friction element 250 may be coupled to second housing 136 and second friction element 260 may be coupled to clutch disc 230.

The coupling of first friction element 250 to second housing 136 and second friction element 260 to clutch disc 230 may take various forms. According to the exemplary embodiment shown in FIG. 6, such coupling is enhanced using resilient members, shown as offsets 270. Offsets 270 may have various shapes (e.g., spherical) and may be manufactured from any material. According to an exemplary embodiment, offsets 270 are rubberized in order to permit a degree of deformation during movement of first friction element 250 with respect to first housing 132 and second friction element 260 with respect to clutch disc 230. Such rubberized offsets may be subjected to a shear force and distort upon movement of first joint 130 to create a desired "feel." According to the exemplary embodiment shown in FIG. 6, clutch disc 230 and second housing 136 include a plurality of detents configured to receive offsets 270. According to still other alternative embodiments, second friction element 260 is coupled to clutch disc 230 and first friction element 250 is coupled to second housing 136 using another means (e.g., O-ring, snap ring, press fit, a snap connection, etc.).

According to the exemplary embodiment shown in FIG. 6, first friction element 250 and second friction element 260 are sandwiched between clutch disc 230 and second housing 136. The force from interface member 240 may be transferred through clutch disc 230 and into second friction element 260. According to exemplary embodiment shown in FIG. 6, the force is then applied by second friction element 260 to first friction element 250.

Referring still to the exemplary embodiment shown in FIG. 6, second housing 136 moves relative to first housing 132. By way of example, second housing 136 may rotate about a central axis of clutch pin 210 relative to first housing 132. During such movement, clutch pin 210 remains stationary due to the coupling between clutch pin 210 and first housing 132. End cap 220 and clutch disc 230 remain stationary with respect to moving second housing 136 due to their threaded and splined connections with clutch pin 210, respectively. Due to the coupling between second friction element 260 and clutch disc 230, second friction element also remains stationary during relative movement between second housing 136 and first housing 132. Due to the coupling between first friction element 250 and second housing 136, first friction element 250 moves relative to first housing 132. Such movement may be rotational movement about the central axis of clutch pin 210. According to the exemplary embodiment shown in FIG. 6 and the aforementioned movement of second housing 136 with respect to first housing 132, first friction element 250 rotates relative to second friction element 260.

Referring still to FIG. 6, relative movement between first friction element 250 and second friction element 260 is resisted by a friction force acting at the contact surface between the first friction element 250 and second friction element 260. Such a friction force may be imparted at least because of the force applied to second friction element 260 by interface member 240. A friction force resists movement of first friction element 250 with respect to second friction element 260 thereby resisting movement of second housing 136 with respect to first housing 132. Such a friction force between first friction element 250 and second friction element 260 within first joint 130, second joint 140, and third joint 150 inhibits relative movement between various components of articulating faucet 50. By way of example, movement of spray head 160 with respect to second arm 90, second arm 90 with respect to first arm 80, or first arm 80 with respect to vertical support 70 may be inhibited.

First friction element 250 and second friction element 260 may be manufactured from various known materials. According to the exemplary embodiment shown in FIG. 6, first friction element 250 and second friction element 260 are manufactured from a ceramic material. Manufacturing the friction elements from a ceramic material provides a specified acceleration between second friction element 260 and first friction element 250. Such a specified acceleration may provide users with a more enjoyable experience while operating articulating faucet 50 due to the "feel" of a ceramic first friction element 250 interacting with a ceramic second friction element 260. Such ceramic components may also improve a user's control of first joint 130, second joint 140, and third joint 150.

Referring still to FIG. 6, clutch assembly 300 further includes a limiter, shown as piston 280, and an actuator, shown as resilient member 290. As shown in FIG. 6, piston 280 and resilient member 290 are located coaxially and positioned within clutch pin 210. According to an exemplary embodiment, piston 280 includes an external hexagon structure configured to be received by an internal hexagon structure within clutch pin 210. Piston 280 may be coupled to clutch pin 210 using protruding tabs on opposing sides of the external hexagon structure. Such protruding tabs are configured to be received by apertures (e.g., slots, detents, indents, undercuts, etc.) within clutch pin 210. According to an exemplary embodiment, the protruding tabs on piston 280 collapse when the external hexagon structure of piston 280 engages the internal hexagon structure of clutch pin 210 and extend within the apertures of clutch pin 210 to slidably couple piston 280 and resilient member 290 within clutch pin 210. Such coupling may contain piston 280 and resilient member 290 within clutch pin 210 while allowing relative movement. According to various alternative embodiments, piston 280 may be coupled to clutch pin 210 using other known techniques (e.g., an interface connection, etc.).

According to the exemplary embodiment shown in FIG. 6, piston 280 further includes a cavity, shown as void 282, and a retaining portion, shown as contact shoulder 284. Resilient member 290 may be received into void 282 of piston 280 and cavity 216 of clutch pin 210. As shown in FIG. 6, resilient member 290 has a first end coupled with clutch pin 210 within cavity 216 and a second end coupled to piston 280 within void 282 at contact shoulder 284. Such coupling of resilient member 290 to clutch pin 210 and resilient member 290 to piston 280 may be accomplished according to various known techniques. According to an exemplary embodiment, resilient member 290 is in contact with clutch pin 210 and piston 280. According to various alternative embodiments, resilient member 290 may be coupled with piston 280 and clutch pin 210 according to other known techniques (e.g., adhesive, press fit, a snap connection, etc.).

Referring still to the exemplary embodiment shown in FIG. 6, piston 280 is coupled to protrusion 224 of end cap 220. According to an exemplary embodiment, such coupling is achieved using a toothed connection. Piston 280 may include a plurality of angled teeth, and protrusion 224 of end cap 220 may include a plurality of mating, angled teeth. This interlocking tooth configuration prevents end cap 220 from rotating relative to clutch pin 210. According to an exemplary embodiment, the angled teeth of piston 280 and protrusion 224 are designed similar to a bevel gear where the pitch angle is equal to 180 degrees and the addendum and dedendum angles are equal. A pitch angle of 180 degrees may create teeth having crests that are distributed equally above and below a flat plane thereby maximizing contact between the mating teeth. The tooth profile may be asymmetric such that rotation of end cap 220 with respect to clutch pin 210 in one direction requires a greater applied torque than in the other direction. According to an exemplary embodiment, the mating teeth are designed such that more torque is required to turn end cap 220 in the direction that loosens end cap 220 within clutch pin 210. Such an asymmetrical tooth design resists the cyclic loosening of end cap 220 within clutch pin 210 that may otherwise occur as first housing 132 is moved relative to second housing 136.

Piston 280 is forced into engagement with end cap 220 by resilient member 290. Resilient member 290 may be a spring having a specified spring force. The spring force from resilient member 290 maintains engagement between the teeth of piston 280 and the mating teeth of protrusion 224 thereby inhibiting rotation between end cap 220 and clutch pin 210.

According to an alternative embodiment, clutch assembly 300 may include two pistons 280. Rather than protrusion 224 of end cap 220 having a plurality of angled teeth, protrusion 224 may receive a piston 280, which has a plurality of angled teeth. Piston 280 may be coupled to end cap 220 using any known technique (e.g., a snap connection, adhesive, hex interface connection, etc.). A second piston 280 may be slidably coupled to clutch pin 210 using any known technique (e.g., a snap connection, hex interface connection, etc.). According to an exemplary embodiment, the angled teeth of pistons 280 are designed such that rotation of end cap 220 with respect to clutch pin 210 may require a greater applied torque in one direction. According to an exemplary embodiment, more torque is required to turn end cap 220 with respect to clutch pin 210 in the direction that loosens end cap 220 within clutch pin 210.

As discussed above, first joint 130 includes flow path 170, according to an exemplary embodiment. Flow path 170 allows water to move within first housing 132 and second housing 136. A seal may prevent water from leaking out of first housing 132 and second housing 136. Such leaking may be prevented by a first seal, shown as first O-ring 400, and a second seal, shown as second O-ring 402. First joint 130 further includes a guide, shown as ring element 404. Ring element 404 ensures coaxial movement between second housing 136 and first housing 132 and prevents metallic contact between second housing 136 and first housing 132. According to an exemplary embodiment, ring element 404 is manufactured from a polymer material.

Figure 7:
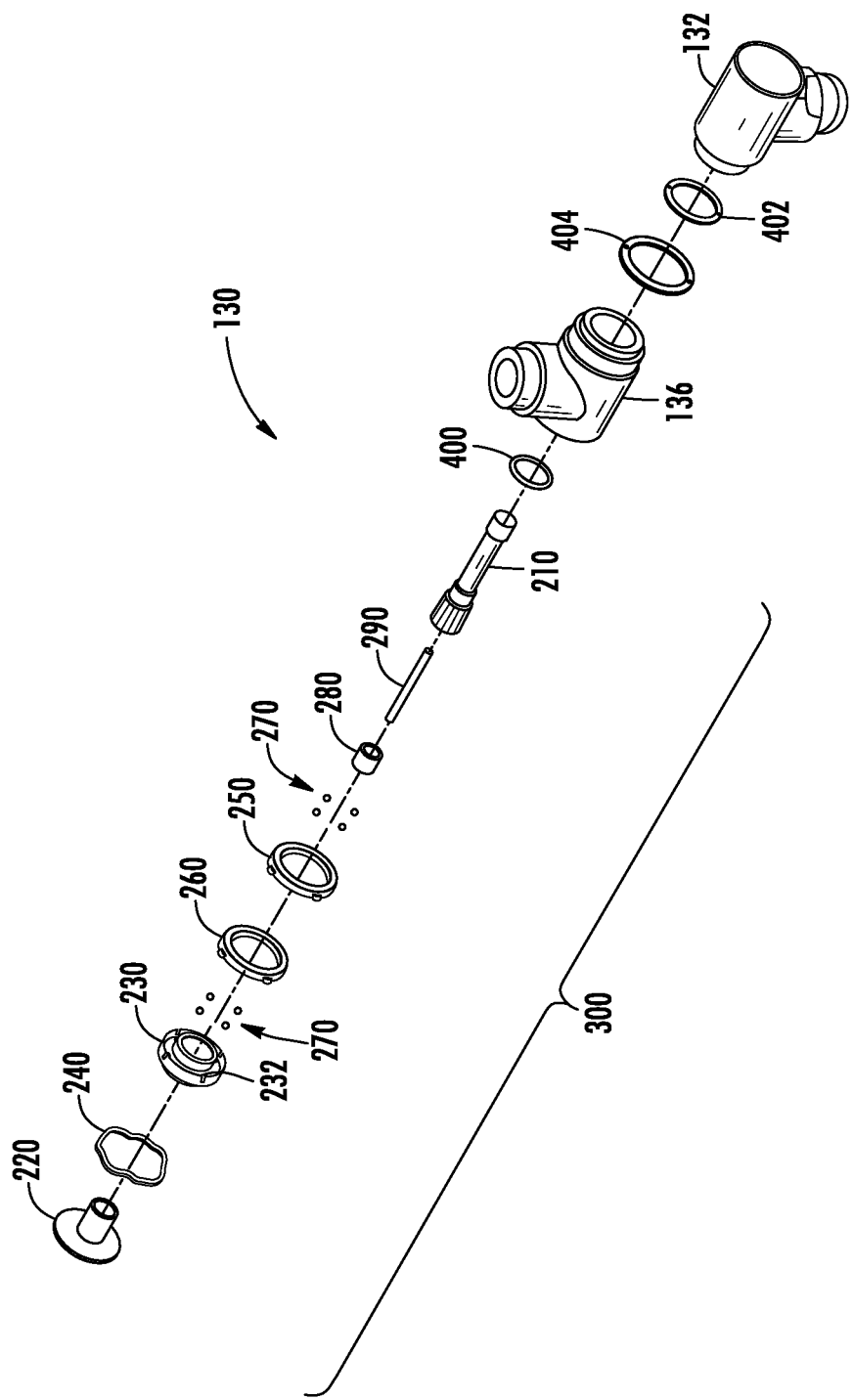
FIG. 7 is an exploded view of an articulating joint assembly, according to an exemplary embodiment.

Referring next to the exemplary embodiment shown in FIG. 7, first joint 130 includes first housing 132, second housing 136, O-rings 400 and 402, ring element 404, and clutch assembly 300. Clutch assembly 300 may include clutch pin 210, piston 28, resilient member 290, offsets 270, first friction element 250, second friction element 260, interface member 240, end cap 220, and clutch disc 230. According to the exemplary embodiment shown in FIG. 7, clutch disc 230 includes an aperture, shown as detent 232. Detent 232 may receive offset 270 to establish a specified standoff distance between clutch pin 210 and clutch disc 230.

Figure 8:
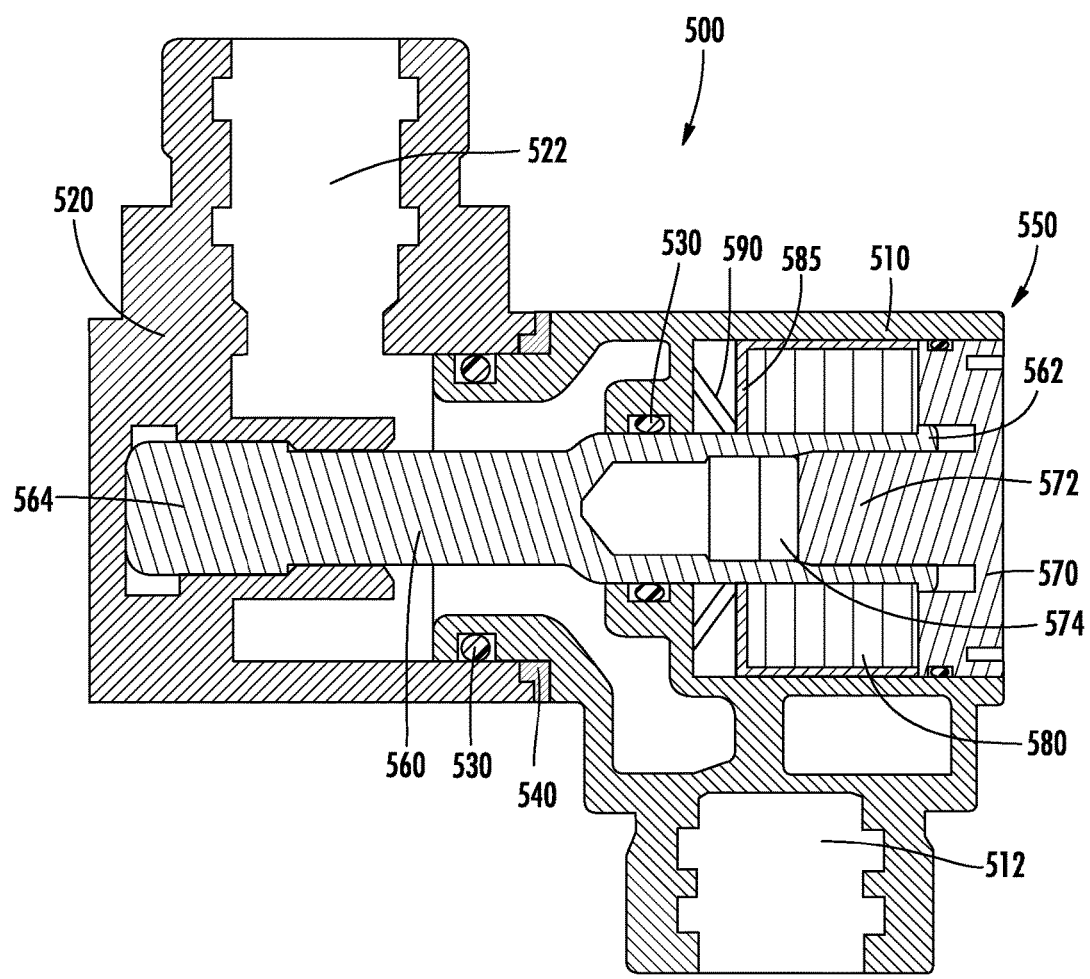
FIG. 8 is a sectional view of an articulating joint assembly, according to an alternative embodiment.
Figure 9:
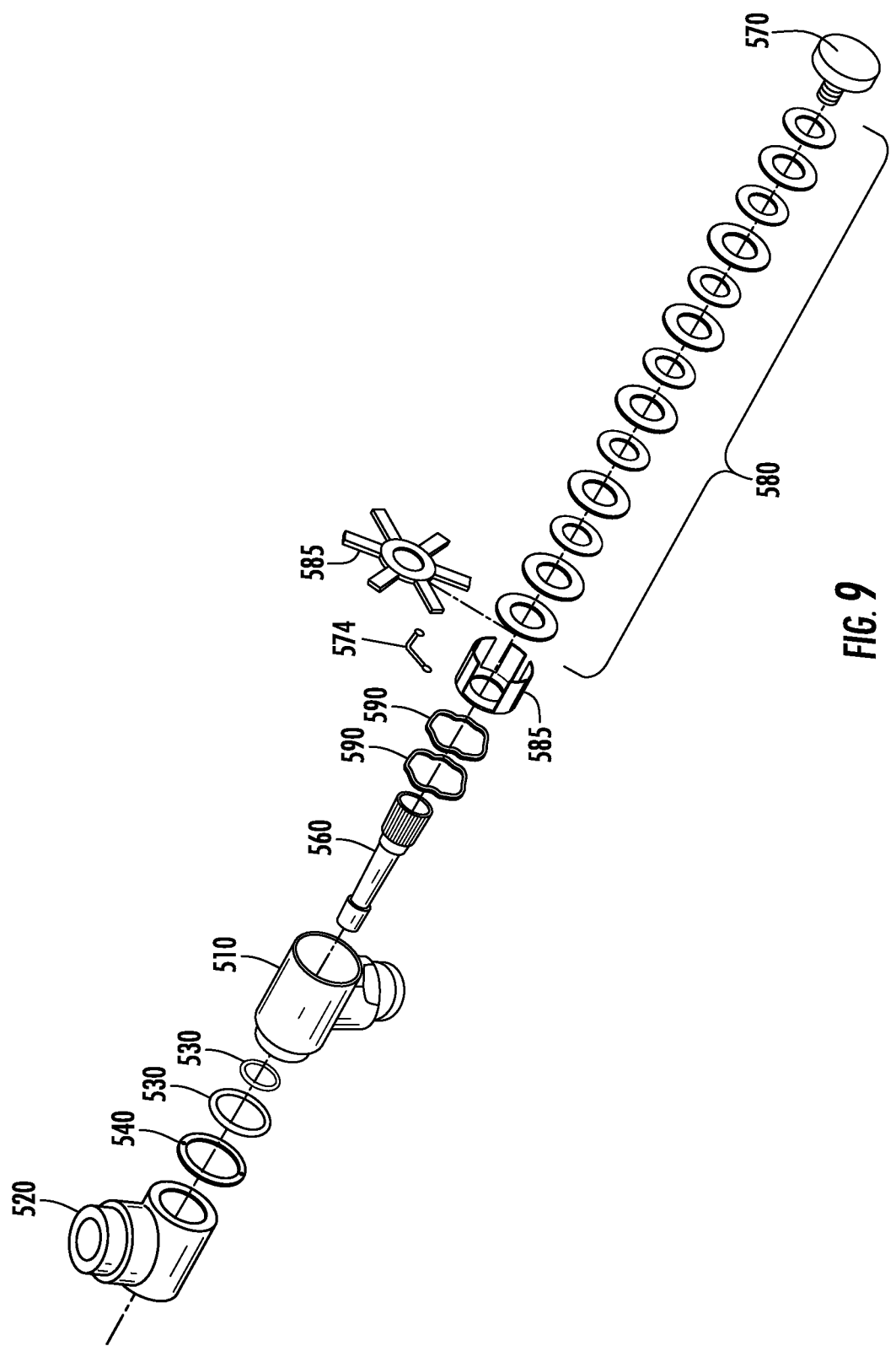
FIG. 9 is an exploded perspective view of an articulating joint assembly, according to an alternative embodiment.

Referring next to FIGS. 8-9, a joint 500 is shown, according to an alternative embodiment. It should be understood that the various joints of an articulating faucet may include similar or identical components and function comparably. As shown in FIG. 8, joint 500 includes a first housing 510 and a second housing 520. According to an exemplary embodiment, first housing 510 and second housing 520 are sealably coupled with O-rings 530. Joint 500 may further include a guide ring 540 that prevents direct contact between first housing 510 and second housing 520. As shown in FIG. 8, first housing 510 includes a first void 512, and second housing 520 includes a second void 522. First void 512 may be in fluid communication with second void 522 such that first void 512 and second void 522 form a fluid flow path through joint 500.

Referring still to the alternative embodiment shown in FIGS. 8-9, joint 500 further includes a clutch 550. As shown in FIG. 8, clutch 550 includes a clutch pin 560 having a first end 562 and a second end 564. The second end 564 of clutch pin 560 may be coupled to second housing 520 using any suitable means (e.g., a snap ring, threaded connection, press fit, etc.). Clutch 550 may further include an adjuster 570 having a protrusion 572 that is coupled to first end 562 of clutch pin 560. According to an exemplary embodiment, protrusion 572 is coupled to clutch pin 560 with a coupler 574. According to an alternative embodiment, adjuster 570 may be coupled to clutch pin 560 using another known technique (e.g., a snap ring, threaded connection, press fit, etc.).

Clutch 550 may further include a plurality of interface members 580 and resilient members 590. Such interface members 580 may be received into a carrier 585 within first housing 510. According to an exemplary embodiment, interface members 580 are a plurality of generally flat discs manufactured from various materials (e.g., plastic, polymer, rubber, etc.). As shown in FIG. 9, carrier 585 may be formed from a generally flat blank that is formed (e.g., folded, bent, stamped, etc.) to receive interface members 580. Contact between interface members 580 may provide a resistive torque that opposes rotational movement of first housing 510 with respect to second housing 520. As shown in FIG. 8, interface members 580 and resilient members 590 are sandwiched between first housing 510 and adjuster 570. A manufacturer or user may rotate adjuster 570 with respect to at least one of clutch pin 560 and second housing 520 to adjust a preload compression on resilient members 590 thereby adjusting the resistive torque that opposes rotational movement of first housing 510 with respect to second housing 520.

Figure 10:
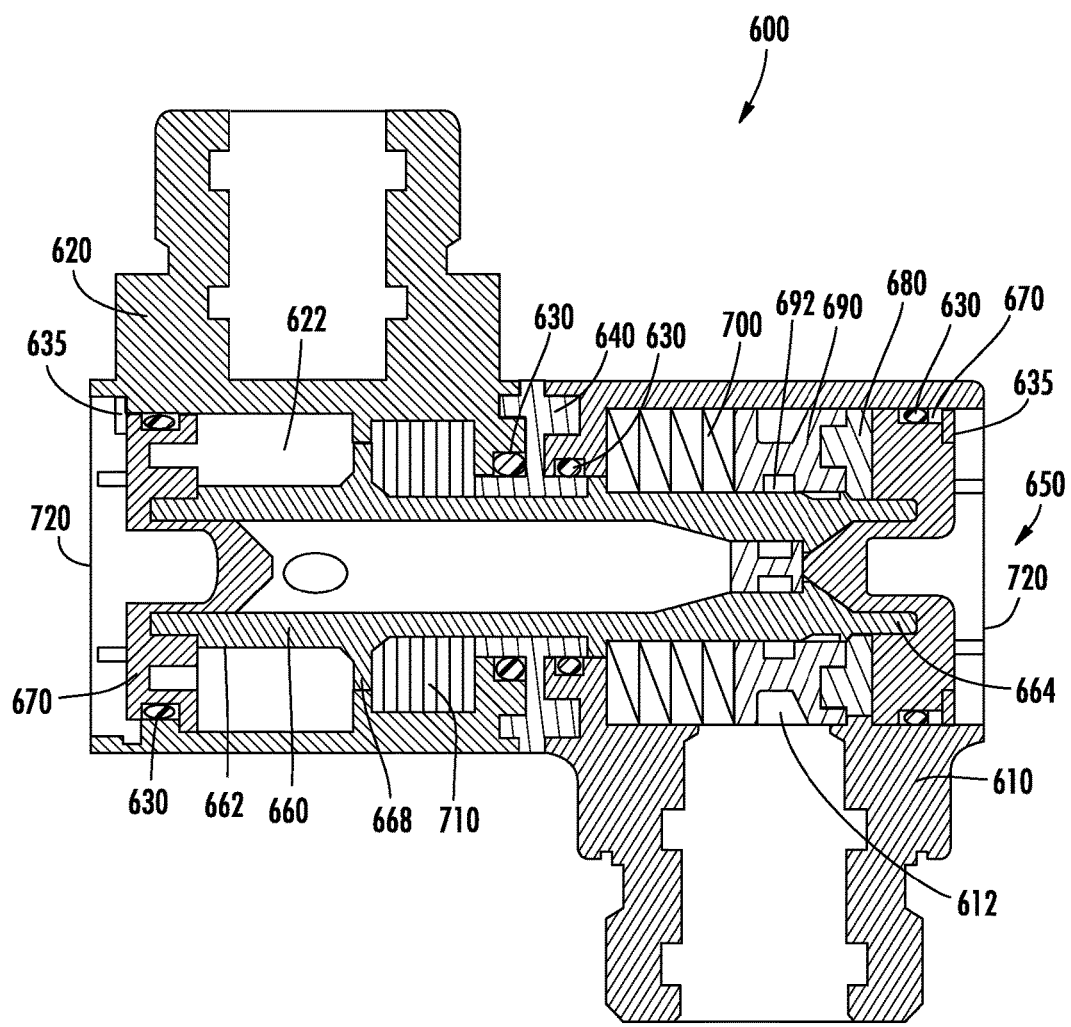
FIG. 10 is a sectional view of an articulating joint assembly, according to an alternative embodiment.
Figure 11:
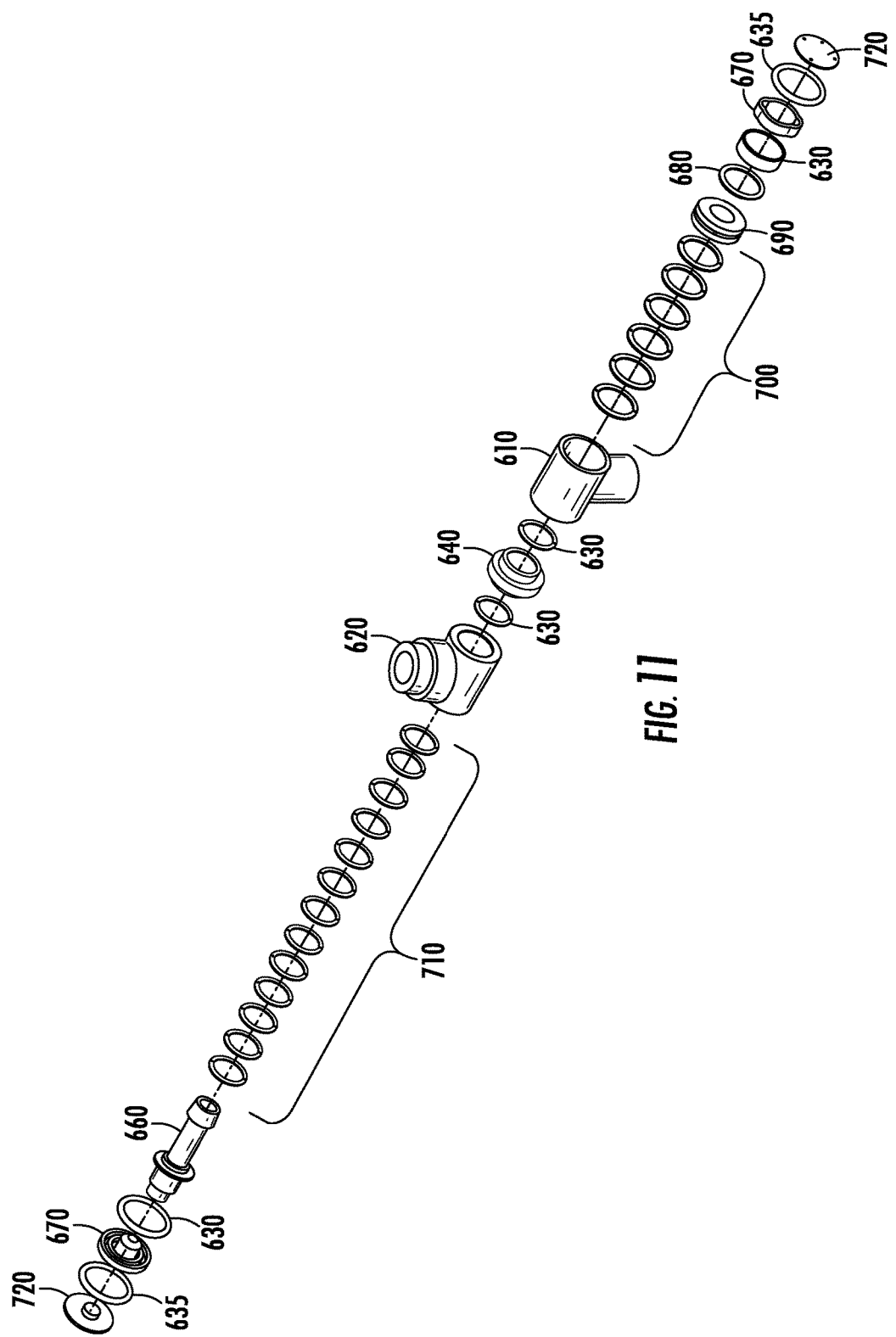
FIG. 11 is an exploded perspective view of an articulating joint assembly, according to an alternative embodiment.

Referring next to FIGS. 10-11, a joint 600 is shown, according to an alternative embodiment. It should be understood that the various joints of an articulating faucet may include similar or identical components and function comparably. As shown in FIG. 10, joint 600 includes a first housing 610 and a second housing 620. First housing 610 and second housing 620 may be sealably coupled together with O-rings 630. Joint 600 may further include a guide ring 640 that prevents direct contact between first housing 610 and second housing 620. As shown in FIG. 10, first housing 610 defines a first void 612, and second housing 620 defines a second void 622. First void 612 may be in fluid communication with second void 622 such that first void 612 and second void 622 form a fluid flow path through joint 600.

Referring still to the alternative embodiment shown in FIGS. 10-11, joint 600 includes a clutch 650 configured to inhibit relative movement between first housing 610 and second housing 620. As shown in FIG. 10, clutch 650 includes a clutch pin 660 having a first end 662 and a second end 664 that are each slidably coupled to locators 670. Locators 670 may be sealably coupled to first housing 610 and second housing 620, respectively, with O-rings 630 and snap rings 635. According to an exemplary embodiment, clutch pin 660 slides within locators 670 and rotates about the central axis of locators 670. As shown in FIG. 10, joint 600 further includes a retainer 680 fixed to second end 664 of clutch pin 660. Retainer 680 may be coupled to clutch pin using various known techniques (e.g., snap fit, press fit, snap ring, etc.). As shown in FIG. 10, joint 600 further includes a spacer 690 having a plurality of apertures 692 designed to facilitate water flow through joint 600. Joint 600 may further include resilient members 700 sandwiched between spacer 690 and first housing 610. According to an exemplary embodiment, resilient members 700 impart a force on clutch pin 660 through spacer 690 and retainer 680 that forces clutch pin 660 towards first housing 610.

As shown in FIG. 10, clutch pin 660 has a protrusion 668 extending axially outward into second void 622. According to an exemplary embodiment, joint 600 includes a plurality of interface members 710 sandwiched between protrusion 668 and second housing 620. Such interface members 710 may be received into a recess of second housing 620 and may include a plurality of generally flat discs manufactured from various materials (e.g., plastic, polymer, rubber, etc.). According to an exemplary embodiment, the force produced by resilient members 700 induces resistive friction forces between interface members 710 as joint 600 is activated. Such resistive friction forces produce a resistive torque that opposes the rotational movement of first housing 610 with respect to second housing 620.

According to an exemplary embodiment, a user, or manufacturer may increase the number of interface members 710 to further compress resilient members 700. Further compressing resilient members 700 increases the forces induced therefrom and increases the friction forces among interface members 710. Varying the number of interface members 710 allows for adjustment of the resistive torque produced by interface members 710. As shown in FIG. 10, joint 600 includes end caps 720 coupled to locators 670 (e.g., with a threaded connection, press fit, snap connection, etc.). Such end caps may structurally or aesthetically contribute to joint 600.

It should also be noted that any references to "upstream," and "downstream" in this description are merely used to identify the various elements as they are oriented in the FIGURES, being relative to a specific direction. These terms are not meant to limit the element that they describe, as the various elements may be oriented differently in various applications.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It may be important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" may be used to mean serving as an example, instance or illustration. Any embodiment or design described herein as "exemplary" may be not necessarily to be construed as preferred or advantageous over other embodiments or designs. Rather, use of the word exemplary may be intended to present concepts in a concrete manner. Accordingly, all such modifications are intended to be included within the scope of the present inventions. The order or sequence of any process or method steps may be varied or re-sequenced according to alternative embodiments. Any means-plus-function clause may be intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A joint for an articulating faucet, comprising:
a first housing defining a first inner cavity;
a second housing defining a second inner cavity, wherein the second housing is coupled to the first housing such that fluid may flow from the first inner cavity to the second inner cavity; and
a clutch assembly coupled to at least one of the first housing and the second housing and configured to apply a resistive torque that inhibits movement of the first and second housings relative to each other, the clutch assembly comprising:
a clutch pin;
an interface member, wherein the interface member is disposed within the second housing, and wherein the interface member includes a first friction element slidably coupled to a second friction element to provide a resistive torque that facilitates a tactile feel during relative motion between the first housing and the second housing; and
an end cap coupled to a first end of the clutch pin and the interface member, wherein movement of the end cap varies the magnitude of the resistive torque applied by the clutch assembly.

2. The joint of claim 1, wherein the interface member is disposed between the end cap and the second housing.

3. The joint of claim 2, wherein the clutch pin extends through the first inner cavity and provides an axis about which the second housing rotates relative to the first housing.

4. The joint of claim 3, wherein the clutch pin includes a second end that is coupled to the first housing with at least one of a threaded connection, a snap connection, and a press fit connection.

5. The joint of claim 4, wherein the interface member comprises a bushing.

6. The joint of claim 4, wherein the interface member comprises a spring.

7. An articulating faucet having a joint according to claim 1.

8. A joint for an articulating faucet, comprising:
a first housing rotatably coupled to a second housing;
a clutch pin including a movable end cap;
an annular clutch disc defining an aperture that receives the clutch pin;
a first friction element coupled to the annular clutch disc;
a second friction element slidably coupled with the first friction element, wherein relative movement between the first friction element and the second friction element provides a resistive torque to facilitate a tactile feel during relative motion between the first housing and the second housing;
an interface member coupled to the annular clutch disc and configured to apply a force to at least one of the first friction element and the second friction element that varies based on the position of the movable end cap.

9. The joint of claim 8, wherein the first friction element is coupled to the annular clutch disc with a first standoff and the second friction element is coupled to the second housing with a second standoff.

10. The joint of claim 9, wherein at least one of the first standoff and the second standoff comprises a synthetic material.

11. The joint of claim 8, wherein at least one of the first friction element and the second friction element is annular and defines an aperture that receives the clutch pin.

12. The joint of claim 11, wherein the first friction element and the second friction element are disposed between the annular clutch disc and the second housing.

13. The joint of claim 12, wherein at least one of the first friction element and the second friction element comprise a ceramic material.

14. The joint of claim 8, further comprising:
a piston; and
a resilient member configured to force the piston into engagement with the movable end cap.

15. The joint of claim 14, wherein the resilient member is a spring.

16. An articulating faucet, comprising:
a vertical support including an upper portion and a lower portion;
a first arm coupled to the upper portion of the vertical support at a first joint;
a second arm coupled to the first arm at a second joint; and
a spray head coupled to the second arm at a third joint, wherein at least one of the first joint, the second joint, and the third joint include a first housing, a second housing, and a clutch assembly, the clutch assembly comprising:
a clutch pin;
an interface member;
an end cap coupled to a first end of the clutch pin and the interface member, wherein movement of the end cap varies the magnitude of a resistive torque applied by the clutch assembly;
a piston; and
a resilient member configured to force the piston into engagement with the end cap.

17. The articulating faucet of claim 16, wherein the interface member is disposed between the end cap and the second housing, and wherein the clutch pin extends through the first housing and provides an axis about which the second housing rotates relative to the first housing.

18. The articulating faucet of claim 16, the clutch assembly further comprising:
an annular clutch disc defining an aperture that receives the clutch pin;
wherein the interface member is configured to apply a force to the annular clutch disc that varies based on the position of the end cap.

* * * * *